United States Patent [19]

Hansen

[11] Patent Number: 4,893,569
[45] Date of Patent: Jan. 16, 1990

[54] SAFETY WALL AND A SAFETY CAGE FOR TIRE INFLATION

[76] Inventor: Arne H. Hansen, Virringvej 2, DK-8660 Skanderborg, Denmark

[21] Appl. No.: 206,492

[22] Filed: Jun. 14, 1988

Related U.S. Application Data

[63] Continuation of Ser. No. 56,656, Jun. 2, 1987, abandoned.

[51] Int. Cl.⁴ ............................ E05G 3/00; E06B 9/00
[52] U.S. Cl. ...................................... 109/1 S; 109/26; 109/49.5; 109/78; 52/670
[58] Field of Search ................... 109/1 R, 1 S, 15, 26, 109/27, 49.5, 58, 78, 79; 52/660, 662, 670, 671, 794, 816; 89/36.01, 36.02, 36.04

[56] References Cited

U.S. PATENT DOCUMENTS

| | | | |
|---|---|---|---|
| 1,562,191 | 11/1925 | Reno | 52/670 |
| 2,038,306 | 4/1936 | Miller | 52/816 |
| 2,315,799 | 4/1943 | La Guardia et al. | 109/49.5 |
| 3,191,728 | 6/1965 | David | 52/670 |
| 3,504,644 | 4/1970 | Schibisch | 109/49.5 |
| 4,389,947 | 6/1983 | King et al. | 109/1 S |

Primary Examiner—Neill R. Wilson
Attorney, Agent, or Firm—Antonelli, Terry & Wands

[57] ABSTRACT

In connection with the inflation of pneumatic vehicle tires the risk exists that the tire explodes and that the nearby operator or other nearby persons are slung away and severely injured by the pressure wave of the exploding tire. The invention provides for a security wall between the inflation area and an adjacent area, whereby the air pressure wave of an exploding tire will be effectively broken before reaching the adjacent area. Preferably, the security wall includes a doubled stretch metal net material with mutually oppositely oriented obliqueness of the opposed mesh strip portions is arranged as a wall element on at least one side of an inflation cage for receiving a tire to be inflated inside such a cage.

4 Claims, 1 Drawing Sheet

SAFETY WALL AND A SAFETY CAGE FOR TIRE INFLATION

This is a continuation of application Ser. No. 056,656, filed June 2, 1987, now abandoned.

BACKGROUND OF THE INVENTION

The present invention relates to an inflating cage for wheels with pneumatic tires. Many tire inflations, e.g. after tire repairs, are still carried out without any screening of the wheel, and it is well known that fatal accidents may occur once in a while if a tire explodes during the inflation. However, it has already been suggested and to a certain extend used that the inflation is carried out in a security cage, which may be a frame construction having sides of a net material so that, in case of a tire explosion, no tire bits or mounting parts are thrown outwards towards persons near the cage.

However, the problem still exists that a tire explosion may cause considerable damage, also if it is not connected with any tire bits, rim parts, or other objects being ejected, since an explosive air escape from an entirely or almost entirely inflated, maybe over-inflated tire may be so forceful that it can hurl a person several meters away from the tire. The risk could of course be countered by using an inflating cage with wall panels of a reasonably strong plate material, but for one thing, by using metal plates, insight into the cage will be hindered, and for another thing the cage will become considerably costlier and heavier than when using wall panels of net material.

With the present invention it has been recognized that it is feasible to obtain a securing against discharge of strong air pressure waves from an exploding tire through a cage wall of net material, if this material is embodied so as to break the concerned air flow by causing a change or rather a double change of direction in the flow.

A net wall of a net material with usual round wires gives a practically unhindered passage of an air pressure wave, whereas, it has been found that a net wall of a so-called stretch metal net material provides a considerable resistance to an air passage. A stretch metal net is particular in that the net wires or strips include flat metal strip portions, which by the stretching of the net structure twist into a position in which their plane sides are oblique in relationship to the plane of the net wall, and these strip portions will hereby have a deflating and thus weakening effect on an air flow hitting such a net wall.

According to the invention, this recognition is made use of by not only relying on the air break effect which a single wall of stretch metal net can supply, as by a suitably open-meshed net this effect will not, after all, be sufficient for a really effective weakening of a strong air flow from an exploding tire, but according to the invention a strongly increased and, in practice, very significant weakening effect is obtained by using a double layer of a stretch metal met material, such that the the obliqueness of the mesh strip portions in the respective two layers is of mutually opposite direction with respect to the substantially parallel planes of the walls themselves.

By using such a double net wall where the two net walls may be placed rather closely to each other, it is obtained that an arriving pressure wave will be deflected first in one direction and immediately thereafter in the opposite direction, whereby a considerable weakening of the air flow is obtained.

The two net walls may be placed with a mutual distance of e.g. 1-15 cm, preferably appx. 4 cm.

In a preferred arrangement the two wall layers of the double wall are of identical shape and are placed mutually offset such that the junctions of the mesh strip portions are located next to the middle of the mesh openings in the other layer, and vice versa.

The double wall may be placed as a screen in any suitable manner between the tire inflation area and a adjacent workshop area, but preferably an inflating cage is provided with said double wall on one or more sides.

In the following, the invention is described in more detail with reference to the accompanying drawing.

DETAILED DESCRIPTION

Figure 1:
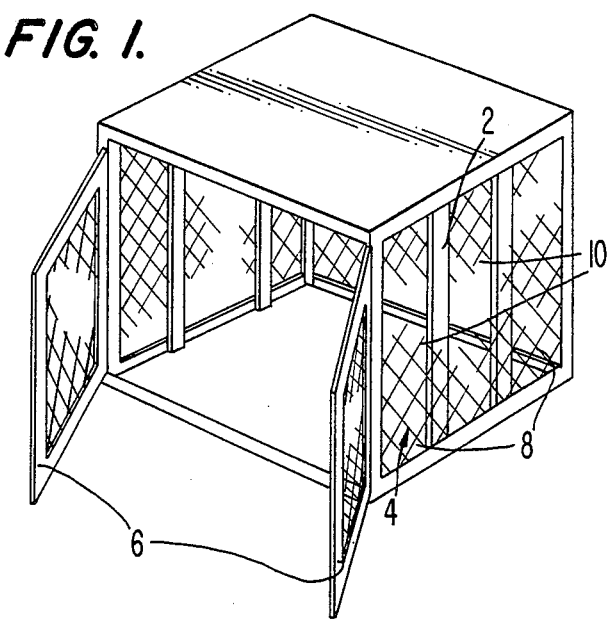
FIG. 1 is a schematic perspective view of an inflating cage according to the invention.

The illustrated cage includes a frame construction with frame portions 2 and side wall portions 4 fastened thereto and includes a double layer of stretch material net. The cage has openable front doors 6, which permit rolling in and out of tires for inflation in the cage, and this may furthermore be provided with mixcellaneous non-illustrated means for carrying out the inflation of the tires. What is essential here is that the cage walls 4 include the double layer of stretch metal net, namely, an outer or network 8 and an inner or network 10, which are placed with a mutual distance of 1-15 cm, preferably appx. 4-6 cm. e.g. separated by the frame portions 2.

Figure 2:
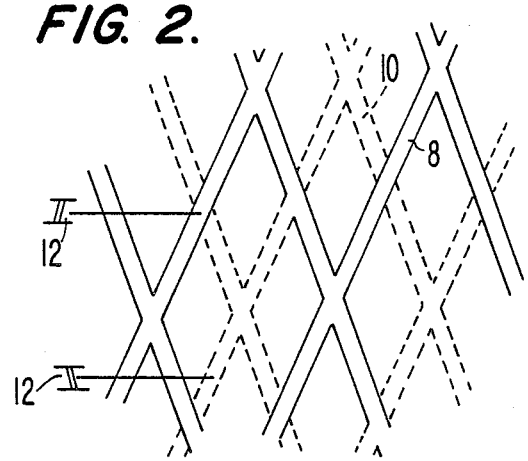
FIG. 2 is a plan view of a wall area thereof.

As shown most clearly in FIG. 2 the inner layer 10 indicated with dotted lines is placed in such a staggered manner relative to the outer layer 8, that its net crossing are positioned against the center of the net meshes in the outer net layer 8, which is indicated in full lines, whereby the two net portions together form a strong barrier against forceful pressure waves from the inside of the inflating cage in the event of a tire explosion therein.

As shown separately at 12, the mesh strips in the network 8 are oblique in such a manner that they will have a deflecting effect on an air flow ejected from the cage, and when also the mesh strips in the inner layer or network 10 are correspondingly, but invertedly, oblique, an ejected pressure waves in case of a tire explosion will be subject to zigzag deflecting and damping effects by the passage of the two layers or networks 8, 10. It has been observed that a powerful tire explosion hereby manifests itself with a quite weak force outside the cage, while such an explosion may otherwise have such a strong effect that a person close by can be hurled 8-10 meters away from the area.

In a practical example the mesh size of the single nets may be appx. 10 cm high and appx. 4 cm wide.

It will be appreciated that the two net layers or networks 8 and 10 should not necessarily by of uniform shape as far as the size and configuration of their meshes are concerned, when it is only ensured that the obliqueness of the mesh strip portions is generally mutually inverted in the two layers or in the respective opposed sub-areas thereof; it would be possible, of course, to subdivide each wall layer in area portions, in which the mesh strips are oblique in mutually opposite directions, whereby care should be taken that the opposite wall layer be substantially correspondingly subdivided with respective inverted orientations of the obliqueness of the mesh strip portions thereof. If desired, of course, the wall structure may comprise more than two layers of net material.

Figure 3:
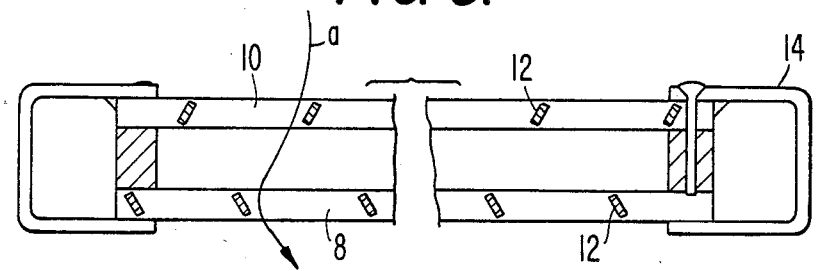
FIG. 3 is a cross-sectional view of a double wall structure for a cage constructed in accordance with the prsent invention.

As shown in FIG. 3, the double wall structure according to the invention is mounted in a frame element 14. It is shown by an arrow a that an air flow against the wall 10 will be deflected in one direction and thereafter, by passing the wall 8, in an opposite direction as described above.

What is claimed is:

1. A safety wall structure for separating a tire inflation area from an adjacent area, the safety wall structure including at least two substantially parallelly arranged wall portions made of a net material of a type having mesh strip portions with substantially planar surfaces twisted out from a plane of the respective wall portions so as to be oblique relative thereto and form an open-mesh net, the wall portion as being arranged with a mutual spacing of at least 1 cm and with opposed mesh stripped portions being oblique in mutually opposite directions with respect to the planes of the wall portions so as to cause a double change in direction of an air flow of an exploding tire thereby preventing a discharge of strong air pressure waves, and wherein mesh junctions of one of the wall portions are staggered with respect mesh junctions of the other wall portions.

2. A safety wall structure as claimed in claim 1, in which the two opposed wall portions are made of metal stretch net material.

3. A safety wall structure for separating a tire inflation area from an adjacent area, the safety wall structure including at least two substantially parallely arranged wall portions made of a nut material of a type having mesh strip portions with substantially planar surfaces twisted out from a plane of the respective wall portions so as to be oblique relative thereto and form an open-mesh net, the wall portion of being arranged with a mutual spacing of at least 1 cm and with opposed mesh strip portions being oblique in mutually opposite directions with respect to the planes of the wall portions so as to cause a double change in direction of the air flow of an exploding tire preventing a discharge of strong air pressure waves, and wherein the at least two parallely arranged wall portions are made of a uniform, and inversely oriented net material, whereby mesh junctions of one of the wall portions are located substantially aligned with a central area of the respective openings in the other wall portion, and vice versa.

4. A tire inflation cage having a plurality of interconnected side walls, at least one of said plurality of interconnected side walls including a safety wall structure according to claim 1.

* * * * *